United States Patent
Uehara et al.

(10) Patent No.: US 7,834,924 B2
(45) Date of Patent: Nov. 16, 2010

(54) PHOTOGRAPHIC APPARATUS

(75) Inventors: Hiroyasu Uehara, Saitama (JP); Kazuhiro Matsumoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 338 days.

(21) Appl. No.: 12/183,376

(22) Filed: Jul. 31, 2008

(65) Prior Publication Data

US 2009/0040347 A1 Feb. 12, 2009

(30) Foreign Application Priority Data

Aug. 9, 2007 (JP) .............................. 2007-207756

(51) Int. Cl.
*H04N 5/222* (2006.01)

(52) U.S. Cl. .............................. 348/333.02; 348/333.12

(58) Field of Classification Search .............. 348/333.1, 348/333.2, 333.11, 333.12
See application file for complete search history.

(56) References Cited

U.S. PATENT DOCUMENTS 6,947,079 B2 * 9/2005 Parulski et al. ........... 348/223.1
7,190,401 B2 * 3/2007 Hara et al. ............. 348/333.02

FOREIGN PATENT DOCUMENTS

JP 2004-282178 A 10/2004

OTHER PUBLICATIONS

English language Abstract and machine translation of JP 2004-282178 A.
"Selecting a Picture Style," Canon EOS 30D Digital, Instruction Manual, pp. 56-62, Canon Inc., Feb. 2006.
U.S. Appl. No. 12/183,374 to Uehara et al., which was filed on Jul. 31, 2008.

* cited by examiner

*Primary Examiner*—Tuan Ho
(74) *Attorney, Agent, or Firm*—Greenblum & Bernstein P.L.C.

(57) ABSTRACT

A photographic apparatus comprises an imaging sensor, an image-processing unit, and a display unit. The imaging sensor obtains image data. The image-processing unit performs an image-processing operation on the image data. The display unit displays an image-processing setting picture having a setting-status indication area that shows a setting status of the image-processing operation, and having a color status indication area that displays a diagrammatic representation of a color status in the image-processing operation corresponding to the setting status. The setting-status indication area shows hue in the image-processing operation, as the setting status. The color status indication area has a figure that shows saturations of a plurality of color components in the image-processing operation in order to display the diagrammatic representation of the color status. The figure is rotated according to said hue. A shape of the figure and a size of the figure change in accordance with the saturations.

6 Claims, 15 Drawing Sheets

PHOTOGRAPHIC APPARATUS

BACKGROUND OF THE INVENTION

1. Field of the Invention

The present invention relates to a photographic apparatus and in particular to the indication of a setting status of the image-processing operation.

2. Description of the Related Art

A photographic apparatus in which the setting status of the image-processing operation can be adjusted is proposed.

A photographic apparatus such as that of Japanese unexamined patent publication (KOKAI) No. 2004-282178, displays an image after the image-processing operation corresponding to the setting status (parameter) of the image-processing operation.

Furthermore, a photographic apparatus is proposed that has a plurality of image tone modes, which are combinations of the setting status including preset values of saturation, hue, sharpness, contrast, etc., and which can be selected.

However, it is not easy to recognize the color status corresponding to the preset values of saturation and hue, even if the image is displayed after the image-processing operation.

Furthermore, it is difficult to imagine the tone of the image corresponding to the setting status of the image-processing operation.

SUMMARY OF THE INVENTION

Therefore, an object of the present invention is to provide a photographic apparatus in which the color status (saturation and hue) corresponding to the setting status of the image-processing operation can be easily recognized visually.

According to the present invention, a photographic apparatus comprises an imaging sensor, an image-processing unit, and a display unit. The imaging sensor obtains image data. The image-processing unit performs an image-processing operation on the image data. The display unit displays an image-processing setting picture having a setting-status indication area that shows a setting status of the image-processing operation, and having a color status indication area that displays a diagrammatic representation of a color status in the image-processing operation corresponding to the setting status. The setting-status indication area shows hue in the image-processing operation, as the setting status. The color status indication area has a figure that shows saturations of a plurality of color components in the image-processing operation in order to display the diagrammatic representation of the color status. The figure is rotated according to said hue. A shape of the figure and a size of the figure change in accordance with the saturations.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
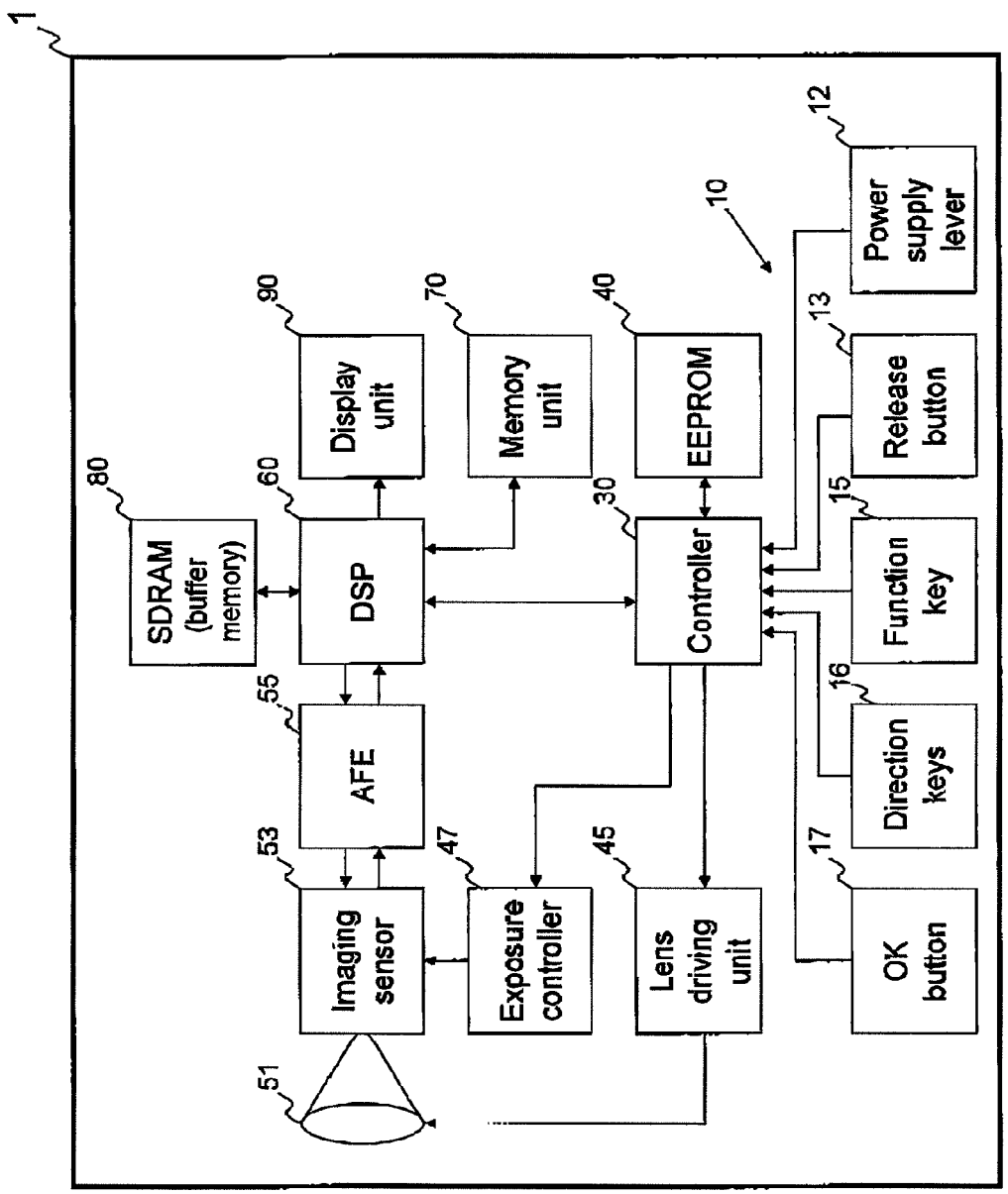
FIG. 1 is a schematic block diagram of the photographic apparatus in the embodiment.

The present invention is described below with reference to the embodiment shown in the drawings. In this embodiment, the photographic apparatus 1 is a digital camera.

The imaging part of the photographic apparatus 1 comprises an operation unit 10, a controller 30, an EEPROM 40, a lens driving unit 45, an exposure controller 47, a lens 51, an imaging sensor 53 such as a CCD etc., an AFE (Analog Front End) 55, a DSP (an image signal-processing circuit) 60, a memory unit 70, an SDRAM (a buffer memory) 80, and a display unit 90 (see FIG. 1).

Figure 2:
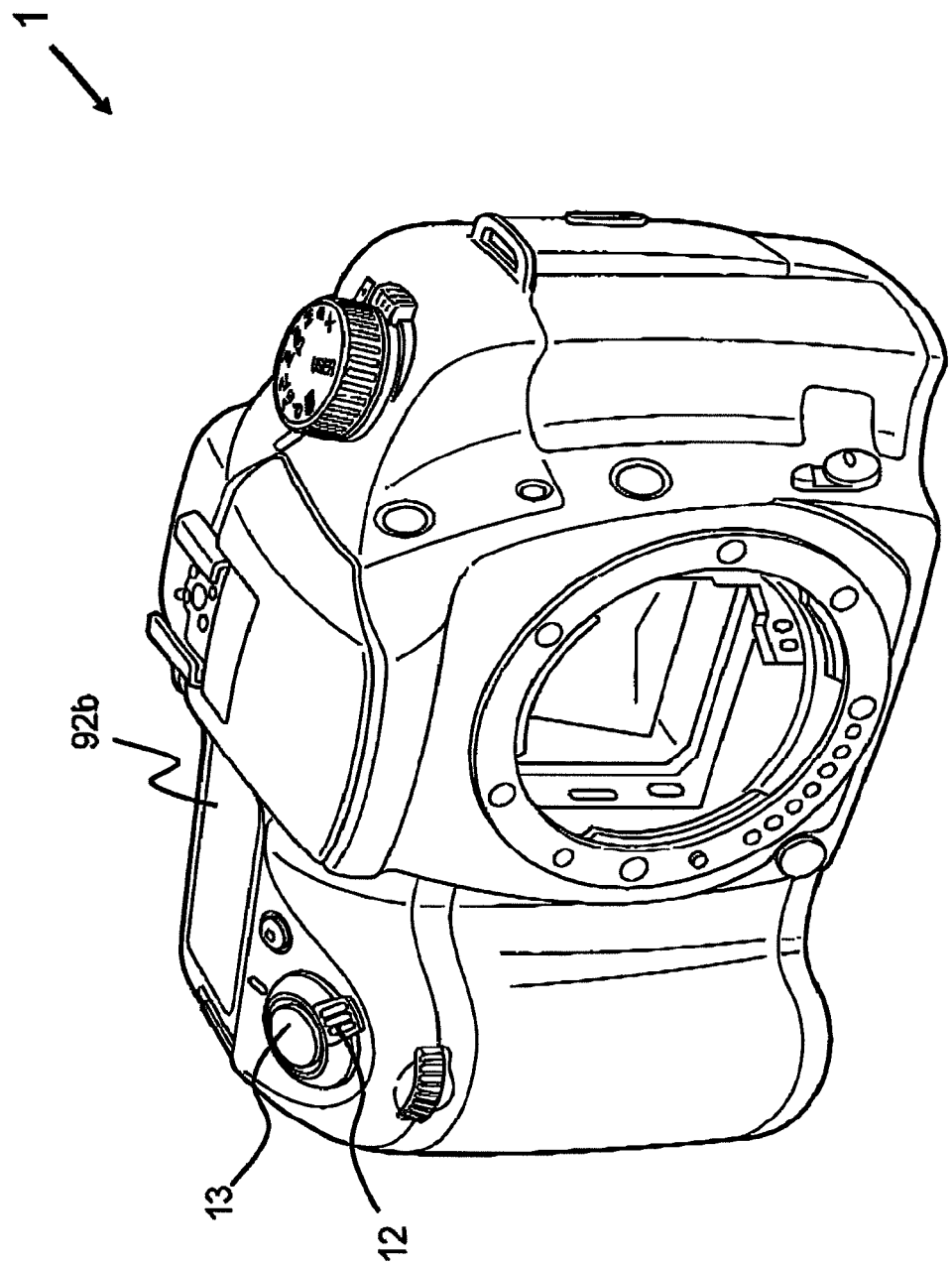
FIG. 2 is a perspective front view of the photographic apparatus.
Figure 3:
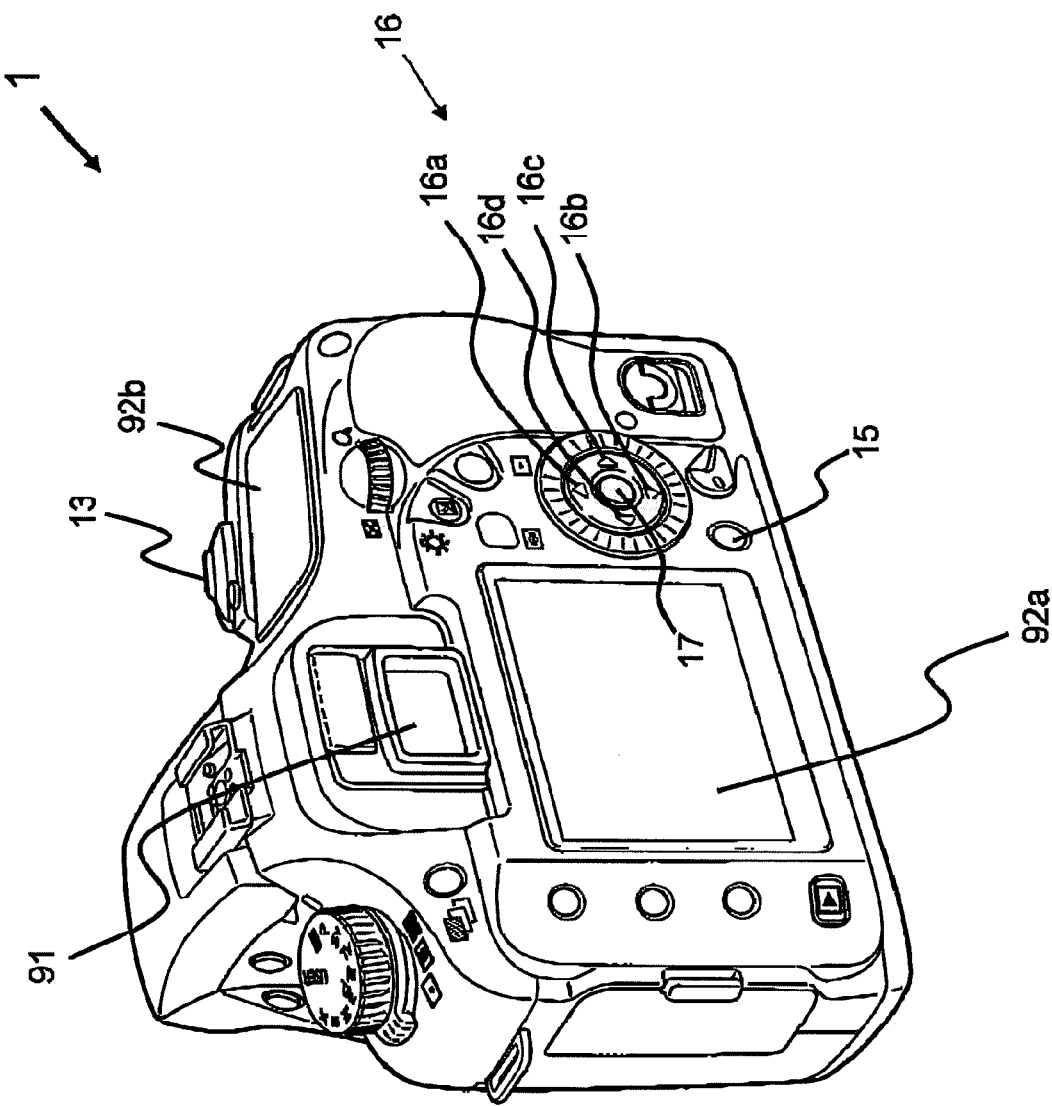
FIG. 3 is a perspective rear view of the photographic apparatus.

The operation unit 10 has a power supply lever 12, a release button 13, a function key 15, direction keys 16, and an OK button 17 (see FIGS. 1 to 3).

The display unit 90 has an optical finder 91, a first display 92a, and a second display 92b.

When the release button 13 is fully depressed, the photographic subject image is captured as an optical image through the lens 51 by the imaging sensor 53, as a photographic operation.

The image obtained by the photographic operation is displayed on the first display 92a after an A/D conversion operation by the AFE 55 and an image-processing operation by the DSP 60.

The image data obtained by the photographic operation is stored in the memory unit 70, with an optional file format such as the JPEG file format or the like.

The photographic subject image through the lens 51 can be optically observed through the optical finder 91.

In terms of the photographic operation, when the power supply lever 12 is moved to the preview position (not depicted), the photographic subject image is captured as an optical image through the lens 51 by the imaging sensor 53.

The image data obtained by the photographic operation is temporarily stored in the SDRAM 80, without image-processing operation, as RAW data or YCbCr data.

The image data is not stored in the memory unit 70. However, the image data that is temporarily stored in the SDRAM may be stored in the memory unit 70 after development of the RAW data or the YCbCr data.

The image data that is temporarily stored in the SDRAM 80 is used for a preview and is used as a confirmation image (a preview image) for a first image-processing setting picture P1, a second image-processing setting picture P2 and a third image-processing setting picture P3 (see FIGS. 8 to 11).

The power supply lever 12 is arranged on a front grip part of the photographic apparatus 1 and is arranged around the release button 13, where the power supply lever 12 can be rotated by the user's right forefinger etc., while holding the photographic apparatus 1.

When the power supply lever 12 is rotated to the ON position that is one of the predetermined positions, the photographic apparatus 1 is set to the ON state.

When the power supply lever 12 is rotated to the OFF position that is one of the predetermined positions, the photographic apparatus 1 is set to the OFF state.

When the power supply lever 12 is rotated to the preview position that is one of the predetermined positions, the photographic operation for temporarily storing the image data to the SDRAM 80 (a preview operation) is performed.

When the release button 13 is partially depressed by the user, the photometric switch (not depicted) changes to the ON state so that the photometric operation is performed by an AE sensor (not depicted), and the AF sensing operation and the focusing operation are performed by the lens driving unit 45.

When the release button 13 is fully depressed by the user, the release switch changes to the ON state so that the photographic operation is performed. The captured image is indicated on the first display 92a and the image date is stored in the memory unit 70.

The image that is captured in the photographic operation when the release button 13 is fully depressed, may be a still image or a video image (moving-image).

The setting status of the image-processing operation by the DSP 60 is adjusted by the user operating the function key 15, the direction keys 16, and the OK button 17.

The adjustment of the setting status of the image-processing operation includes a selection of an image tone mode that is a combination of saturations of color components, hue, sharpness, contrast, etc., and an adjustment of the preset values of general saturation, hue, sharpness, contrast, etc in the image tone mode.

In the embodiment, when the image tone mode is changed, the combination of saturations of color components is changed.

When the preset value of general saturation is changed, all the saturations of the color components are changed in the same ratio.

The function key 15 is arranged on a lower right rear surface of the photographic apparatus 1. The direction keys 16 are comprised of an up-direction key 16a, a down-direction key 16b, a right-direction key 16c, and a left-direction key 16d, and are arranged on a right rear surface of the photographic apparatus 1 where the direction keys 16 surround the OK button 17.

When the function key 15 is depressed, a function setting display (not depicted) is indicated on the first display 92a. Moreover, when the OK button 17 is depressed, the first image-processing setting picture P1 is indicated on the first display 92a (see FIGS. 4 and 8).

When the direction keys 16 are operated under the condition in which the information regarding the setting status of the image-processing operation (the first, second, and third image-processing setting pictures P1, P2, and P3) is indicated on the first display 92a, the setting status of the image-processing operation is adjusted.

The OK button 17 is used for switching between the function setting display and the first image-processing setting picture P1 and for determining the setting status of the image-processing operation (the image tone mode and the preset value of the general maturation, hue, etc.) that is adjusted by operating the direction keys 16.

When the OK button 17 is depressed under the condition in which one of the first, second, and third image-processing setting pictures P1, P2, and P3 is indicated, the preset values of general saturation, hue, contrast, and sharpness in the selected image tone mode are determined (fixed). The indication is then switched from one of the first, second, and third image-processing setting pictures P1, P2, and P3 to the normal capture mode.

When at least one of the preset values regarding the image-processing operation, such as the general saturation, etc., is changed, the changed preset value is overwritten to the EEPROM 40.

The controller 30 is a control apparatus that controls each part of the photographic apparatus 1 in its photographic operation. In particular, the controller 30 changes the setting status of the image-processing operation in accordance with the operation unit 10 when the adjustment of the setting status of the image-processing operation is carried out.

Furthermore, when the preview operation is performed, the controller 30 controls the DSP 60 to perform the image-processing operation on the still image that is indicated in the preview operation, on the basis of the setting status of the image-processing operation.

Moreover, the controller 30 controls the first display 92a to display the information regarding the setting status of the image-processing operation (the indications of the first, second, and third image-processing setting pictures P1, P2, and P3) and the indication of the still image on the first display 92a after the image-processing operation has been made.

In addition, the controller 30 drives the first display 92a to display a diagrammatic representation of saturations of red R, green G, blue B, yellow Y that has a complementary relationship with blue B, cyan C that has a complementary relationship with red R, and magenta M that has a complementary relationship with green G in the image-processing operation, on a color status display area IP70 of the first, second, and third image-processing setting pictures P1, P2, and P3, through a radar chart CH, on the basis of the selected image tone mode and the preset value of general saturation.

Also, the controller 30 drives the first display 92a to display a diagrammatic representation of the degree of hue rotation in the image-processing operation, in the color status display area IP70 of the first, second, and third image-processing setting pictures P1, P2, and P3, by rotating the radar chart CH around the origin point O, on the basis of the preset value of hue, that is, in correspondence with the direction and quantity of hue change.

Accordingly, the user can visually recognize the color status corresponding to the selection of the image tone mode of the image-processing operation and the adjustment of the preset values of general saturation, etc. that are used in the image-processing operation.

The color status includes the color intensity, the degree of general saturation, and the degree of color change caused by hue. The color intensity in the image-processing operation can be visually recognized by the shape of the radar chart CH. The degree of general saturation in the image-processing operation can be visually recognized by the size of the radar chart CH. The degree of color change caused by hue in the image-processing operation can be visually recognized by the inclination degree of the radar chart CH.

The radar chart CH has six apexes that respectively show color components in the image-processing operation (R, Y, G, C, B, and M) and is a two-dimensional hexagonal figure whose size changes in accordance with general saturation. The radar chart CH is used for the two-dimensional representation of the setting status of the image-processing operation.

The EEPROM 40 stores the preset values regarding the image-processing operation, such as general saturation, etc.

The preset values regarding the image-processing operation, such as general saturation, etc., that are preset by the manufacturer for each image tone mode are stored in the EEPROM 40 as initial values.

However, the preset values can optionally be changed and stored for the operation unit 10 by the user.

However, saturation of each color component can not be optionally changed, only general saturation can be optionally changed.

The AFE 55 converts the analog image signal obtained by the imaging senator 53 to the digital signal. The DSP 60 performs the image-processing operation for the digital signal.

The optical finder 91 is a finder for observing the optical image of the photographic subject through the lens 51. With one eye, the user may use the optical finder 91 to observe the exposure condition set by the user or calculated by the photometric operation.

The first display 92*a* is an indicating apparatus that is arranged on the rear surface of the photographic apparatus 1 and indicates the image obtained by the photographic operation (including the still image that is used for the preview operation). The first display 92 also indicates the information regarding the setting status of the image-processing operation (the first, second, and third image-processing setting pictures P1, P2, and P3).

The second display 92*b* is an indicating apparatus that is arranged on the top surface of the photographic apparatus 1 and provides information about the function that is set in regard to the exposure condition, the white balance etc., and the storage operation.

The first display 92*a* shows the first image-processing setting picture P1 containing the information regarding the setting status of the image-processing operation, selected through operation of the function key 15 and the OK button 17 in the normal capture mode.

Figure 8:
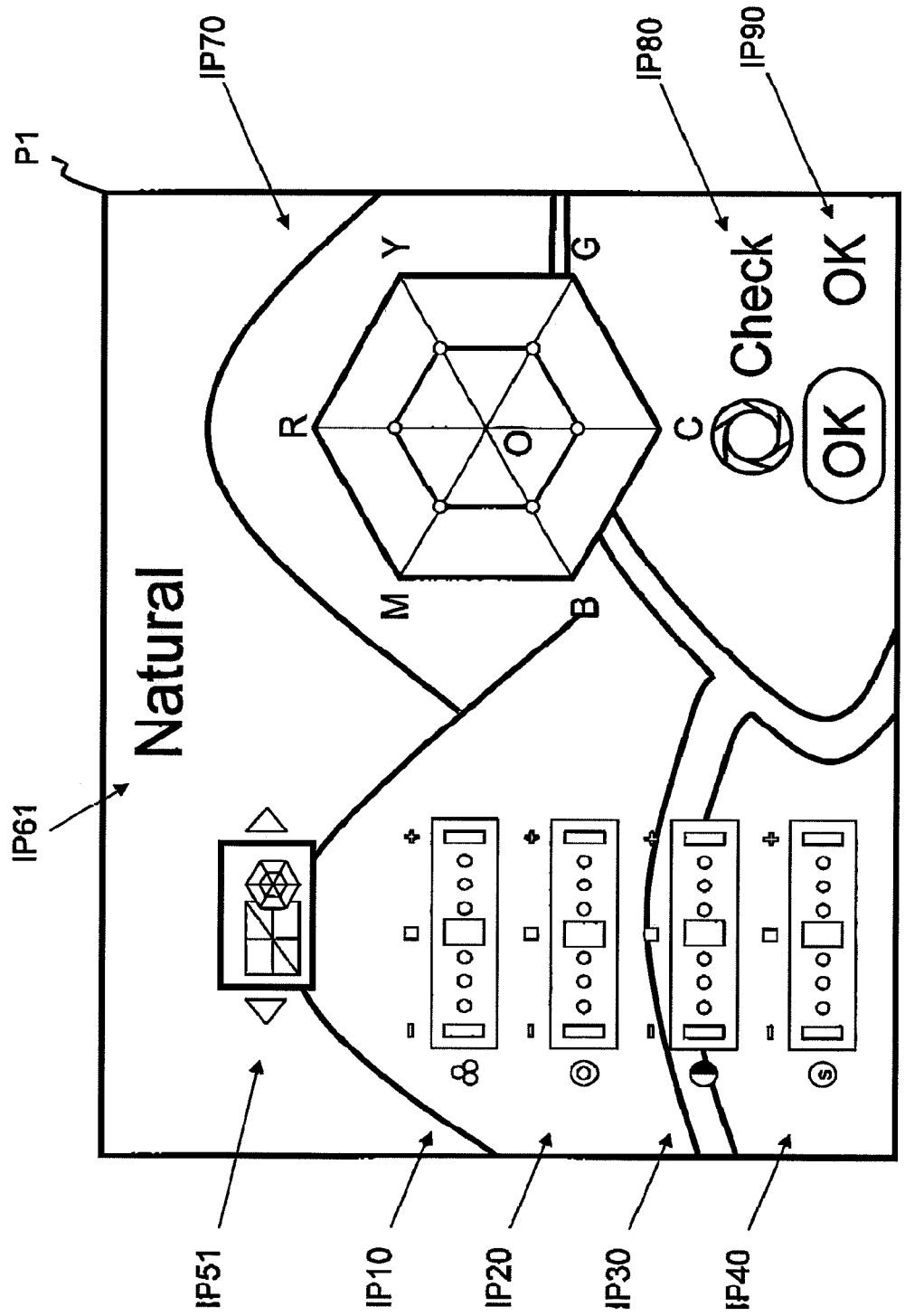
FIG. 8 is the display content of the first image-processing setting picture and the preview image.

When the image data has been temporarily stored in the SDRAM 80, the information regarding the setting status of the image-processing operation (the first image-processing setting picture P1) is superimposed on the most recent image data in the preview operation on the first display 92*a* (on-screen indication, see FIG. 8).

Figure 4:
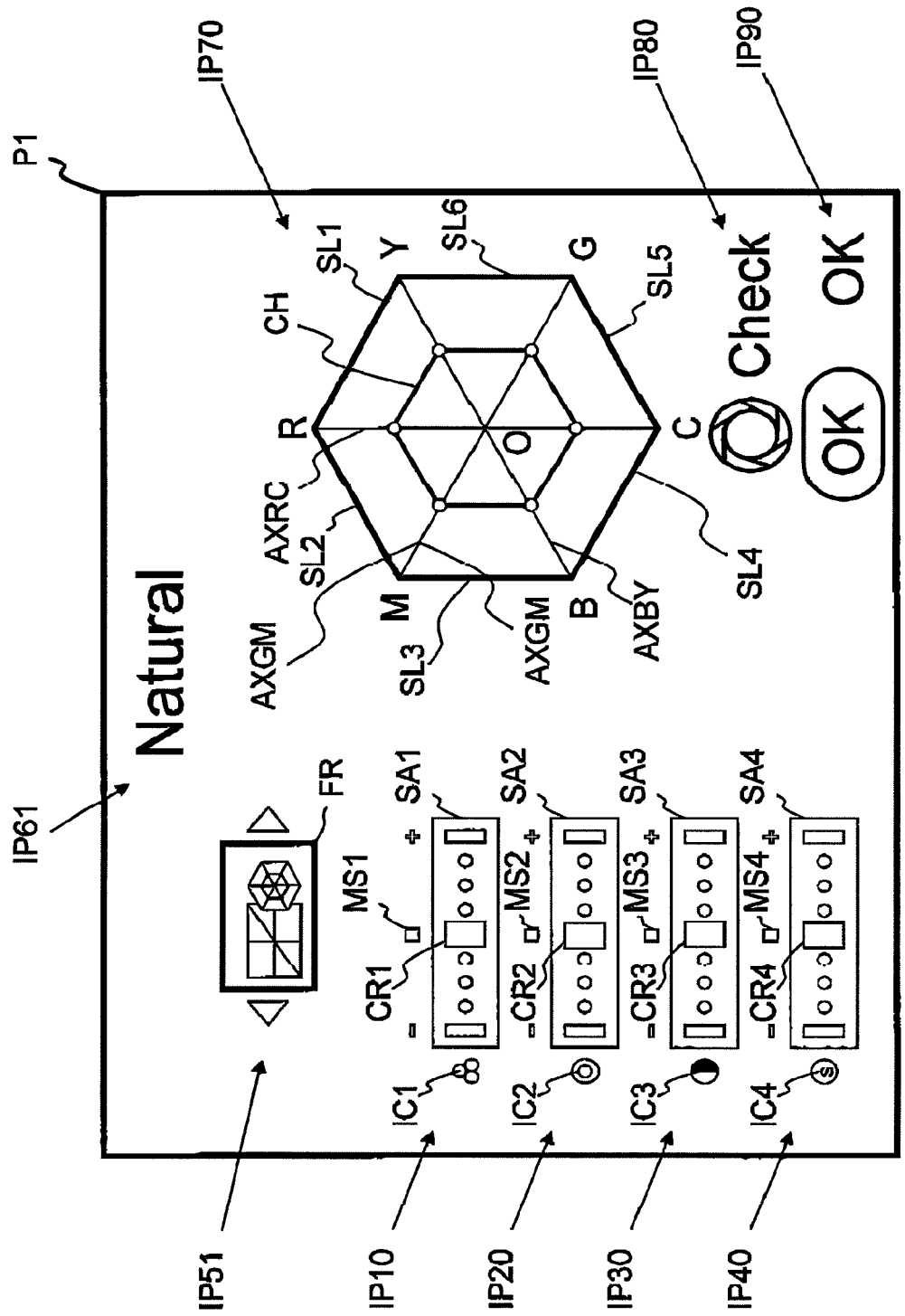
FIG. 4 is the display content of the first image-processing setting picture without the preview image.

When the image data has not been temporarily stored in the SDRAM 80, the information regarding the setting status of the image-processing operation (the first image-processing setting picture P1) is displayed without preview (see FIG. 4).

Next, the details of the first, second, and third image-processing setting pictures P1, P2, and P3 are explained.

The first image-processing setting picture P1 has a general-saturation-setting indication area IP10, a hue-setting indication area IP20, a contrast-setting indication area IP30, a sharpness setting indication area IP40, a first image-tone mode indication area IP51, an image tone mode identification area IP61, a color status indication area IP70, a preview command indication area IP80, and a decision command indication area IP90 (see FIGS. 4 and 8).

The general-saturation-setting indication area IP10 is used for adjusting the preset value of general saturation in the image-processing operation.

The hue-setting indication area IP20 is used for adjusting the preset hue value in the image-processing operation.

The contrast-setting indication area IP30 is used for adjusting the preset value of contrast in the image-processing operation.

The sharpness-setting indication area IP40 is used for adjusting the preset value of sharpness in the image-processing operation.

The first image-tone mode indication area IP51 displays an icon to indicate information regarding the selected image tone mode.

The image tone mode identification area IP 61 displays the name of the selected image tone mode.

The color status indication area IP70 illustrates (by diagrammatic representation) the color status of red R, yellow Y, green G, cyan C, blue B, and magenta M, on the basis of the preset values in the image-processing operation.

The preview command indication area IP80 displays an icon and a letter to indicate information regarding the command of the preview operation.

When the power supply lever 12 is rotated to the preview position under the condition in which the first image-processing setting picture P1 is indicated, the photographic operation for temporarily storing the image data to the SDRAM 80 (the preview operation) is performed immediately.

The decision command indication area IP90 displays an icon and a letter to provide information regarding the use of the OK button 17.

When the OK button 17 is depressed under the condition in which the first image-processing setting picture P1 is indicated on the first display 92*a*, the setting status of the image-processing operation is determined (fixed) and then the display is switched from the first image-processing setting picture P1 to the normal capture mode.

FIGS. 4 and 8 show the case in which the natural image tone mode is selected as the image tone mode.

The general-saturation-setting indication area IP10 has a first icon IC1, a first cursor CR1, a first manufacturer preset value MS1, and a first movement range SA1.

The first icon IC1 indicates that the slider to its right is for the adjustment or general saturation.

The first cursor CR1 shows the preset value of general saturation that is adjusted by the user.

The first manufacturer preset value MS1 shows the preset value of general saturation that was preset by the manufacturer.

The first movement range SA1 shows the movement range of the first cursor CR1.

In FIGS. 4 and 8, the preset value of general saturation that is adjusted by the user and the preset value of general saturation that was preset by the manufacturer are the same and the intermediate value (the reference value).

The first cursor CR1 can be moved in the horizontal direction and the preset value of general saturation that is adjusted by the user can be changed, by operating the right direction key 15*c* or the left direction key 16*d*. However, the first manufacturer preset value MS1 can not be changed. Therefore, the difference between the preset value of general saturation that is adjusted by the user and the preset value of general saturation that was preset by the manufacturer can be visually recognized.

The first ion IC1 and the first movement range SA1 of the general-saturation-setting indication area IP10 are of a non-transparent color. Therefore, the parts of the preview image superimposed by the first icon IC1 and the first movement range SA1 are not visible.

The hue-setting indication area IP20 has a second icon IC2, a second cursor CR2, a second manufacturer preset value MS2, and a second movement range SA2.

The second icon IC2 indicates that the slider to its right is for the adjustment of hue.

The second cursor CR2 shows the preset value of hue that is adjusted by the user.

The second manufacturer preset value MS2 shows the preset value of hue that was preset by the manufacturer.

The second movement range SA2 shows the movement range of the second cursor CR2.

In FIGS. 4 and 8, the preset value of hue that is adjusted by the user and the preset value of hue that was preset by the manufacturer are the same and the intermediate value (the reference value).

The second cursor CR2 can be moved in the horizontal direction and the preset value of hue that is adjusted by the user can be changed, by operating the right direction key 15c or the left direction key 16d. However, the second manufacturer preset value MS2 can not be changed. Therefore, the difference between the preset value of hue that is adjusted by the user and the preset value of hue that was preset by the manufacturer can be visually recognized.

The second icon IC2 and the second movement range SA2 of the hue-setting indication area IP20 are of a non-transparent color. Therefore, the parts of the preview image superimposed by the second icon IC2 and the second movement range SA2 are not visible.

The contrast-setting indication area IP30 has a third icon IC3, a third cursor CR3, a third manufacturer preset value MS3, and a third movement range SA3.

The third icon IC3 indicates that the slider to its right is for the adjustment of contrast.

The third cursor CR3 shows the preset value of contrast that is adjusted by the user.

The third manufacturer preset value MS3 shows the preset value of contrast that was preset by the manufacturer.

The third movement range SA3 shown the movement range of the third cursor CR3.

In FIGS. 4 and 8, the preset value of contrast that is adjusted by the user and the preset value of contrast that was preset by the manufacturer are the same and the intermediate value (the reference value).

The third cursor CR3 can be moved in the horizontal direction and the preset value of contract that is adjusted by the user can be changed, by operating the right direction key 15c or the left direction key 16d. However, the third manufacturer preset value MS3 can not be changed. Therefore, the difference between the preset value of contrast that is adjusted by the user and the preset value of contrast that was preset by the manufacturer can be visually recognized.

The third icon IC3 and the third movement range SA3 of the contrast-setting indication area IP30 are of a non-transparent color. Therefore, the parts of the preview image superimposed by the third icon IC3 and the third movement range SA3 are not visible.

The sharpness-setting indication area IP40 has a fourth icon IC4, a fourth cursor CR4, a fourth manufacturer preset value MS4, and a fourth movement range SA4.

The fourth icon IC4 indicates that the slider to its right is for the adjustment of sharpness.

The fourth cursor CR4 shows the preset value of sharpness that is adjusted by the user.

The fourth manufacturer preset value MS4 shows the preset value or sharpness that was preset by the manufacturer.

The fourth movement range SA4 shows the movement range of the fourth cursor CR4.

In FIGS. 4 and 8, the preset value of sharpness that is adjusted by the user and the preset value of sharpness that was preset by the manufacturer are the same and the intermediate value (the reference value).

The fourth cursor CR4 can be moved in the horizontal direction and the preset value of contrast that is adjusted by the user can be changed, by operating the right direction key 15c or the left direction key 16d. However, the fourth manufacturer preset value MS4 can not be changed. Therefore, the difference between the preset value of sharpness that is adjusted by the user and the preset value of sharpness that was preset by the manufacturer can be visually recognized.

The fourth icon IC4 and the fourth movement range SA4 of the sharpness-setting indication area IP40 are of a non-transparent color. Therefore, the parts of the preview image superimposed by the fourth icon IC4 and the fourth movement range SA4 are not visible.

An icon part of the first image-tone mode indication area IP51 is of a non-transparent color. Therefore, the part of the preview image superimposed by the icon part of the first image-tone mode Indication area IP51 is not visible.

The color status indication area IP70 has a radar chart CH on a hexagonal indication area having an RC axis AXRC, a GM axis AXGM, and a BY axis AXBY, represented by three diagonal lines passing through the center of the hexagonal indication area (the origin point O).

The radar chart CH has six sides. The six sides of the radar chart CH links an R point (a first apex) that shows saturation of red R plotted on the RC axis AXRC, an M point (a second apex) that shows saturation of magenta M plotted on the GM axis AXGM, a B point (a third apex) that shows saturation of blue B plotted on the BY axis AXBY, a c point (a fourth apex) that shows saturation of cyan C plotted on the RC axis AXRC, a G point (a fifth apex) that shows saturation of green G plotted on the GM axis AXGM, and a Y point (a sixth apex) that shows saturation of yellow Y plotted on the BY axis AXBY.

The origin point O of the radar chart CH is arranged between the first apex and the fourth apex on the RC axis AXRC. Similarly, the origin point O of the radar chart CH is arranged between the second apex and the fifth apex on the GM axis AXGM. Furthermore, the origin point O of the radar chart CH in arranged between the third apex and the sixth apex on the BY axis AXBY.

However, when the preset value of hue is changed from the intermediate value, the R point and the C point are plotted on a line rotated from the RC axis AXRC at a predetermined degree corresponding to the degree of color change from the intermediate value caused by hue, the X point and the G point are plotted on a line rotated from the GM axis AXGM at the predetermined degree, and the B point and the Y point are plotted on a line rotated from the BY axis AXBY at the predetermined degree. The predetermined degree is the inclination degree of the radar chart CH.

An intersection point of the RX axis AXRC, the GM axis AXGM, and the BY axis AXBY, in other words, the origin point O shows the minimum saturation value. The length from the origin point O shows the degree of saturation.

When the natural image tone mode that does not emphasize each color is selected as the image tone mode, the preset hue value is set to the intermediate value that the radar chart CH forms a regular hexagon, the R point and the C point are plotted on the RX axis AXRC, the M point and the G point are plotted on the GM axis AXGM, and the B point and the Y point are plotted on the BY axis AXBY.

Figure 5:
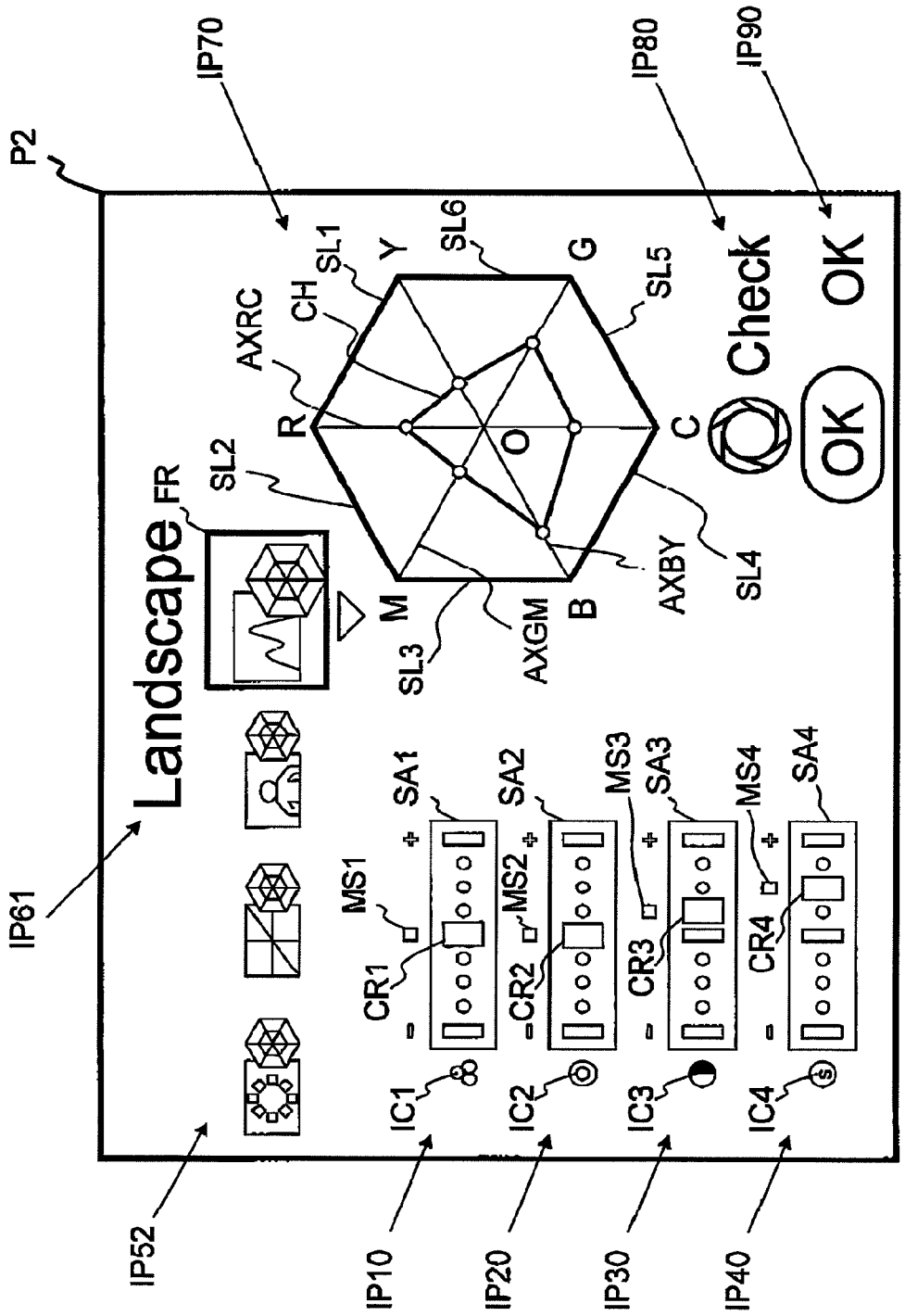
FIG. 5 is the display content of the second image-processing setting picture without the preview image.
Figure 9:
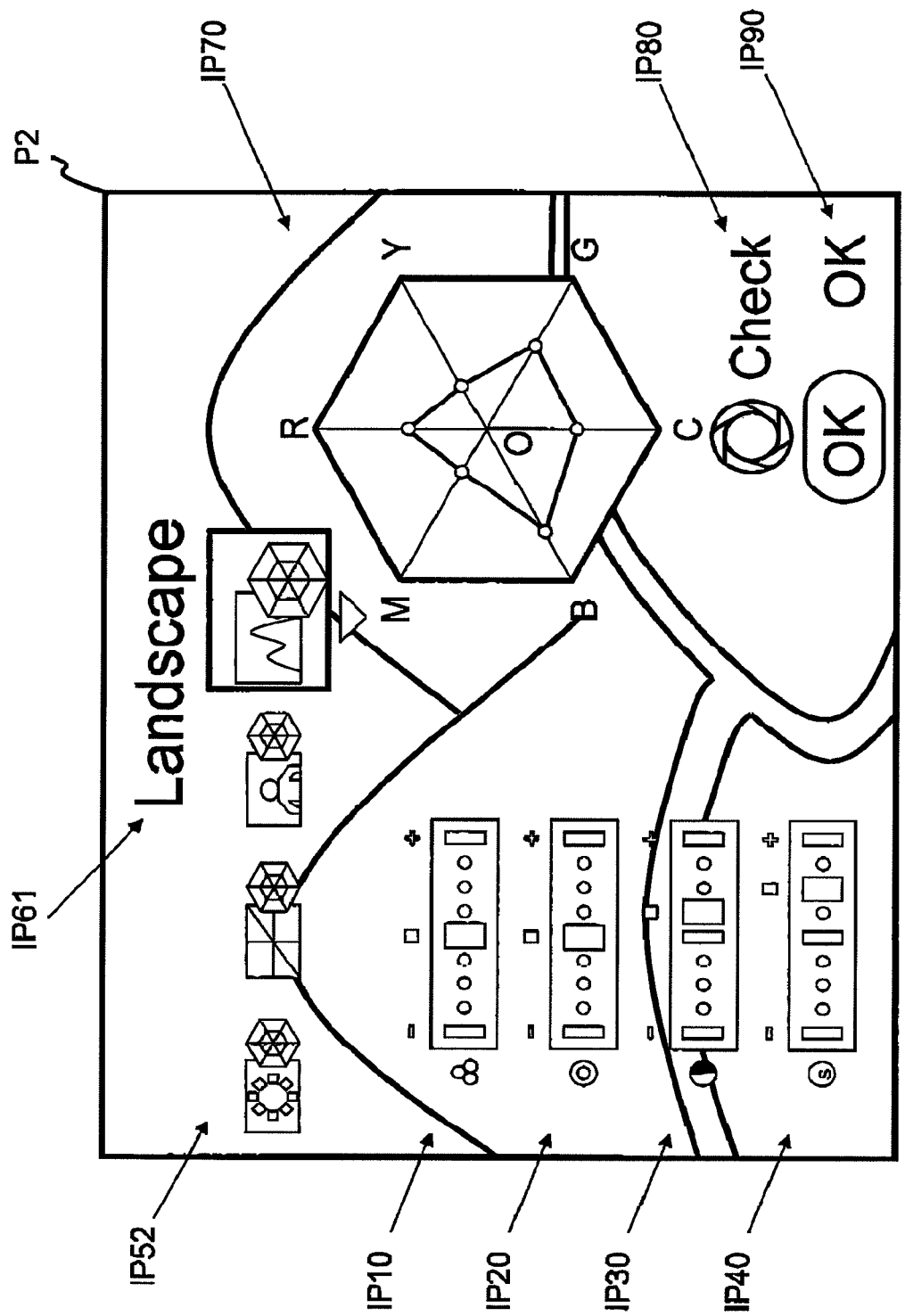
FIG. 9 is the display content of the second image-processing setting picture and the preview image.

When another mode that emphasizes or attenuates at least one of red R, magenta M, blue B, cyan C, green G, and yellow Y is selected as the image tone mode, for example, the landscape mode that emphasizes blue B and attenuates magenta M and yellow Y is selected as the image tone mode, the radar chart CH forms a hexagon that is not same as the regular hexagon (see FIGS. 5 and 9).

Figure 6:
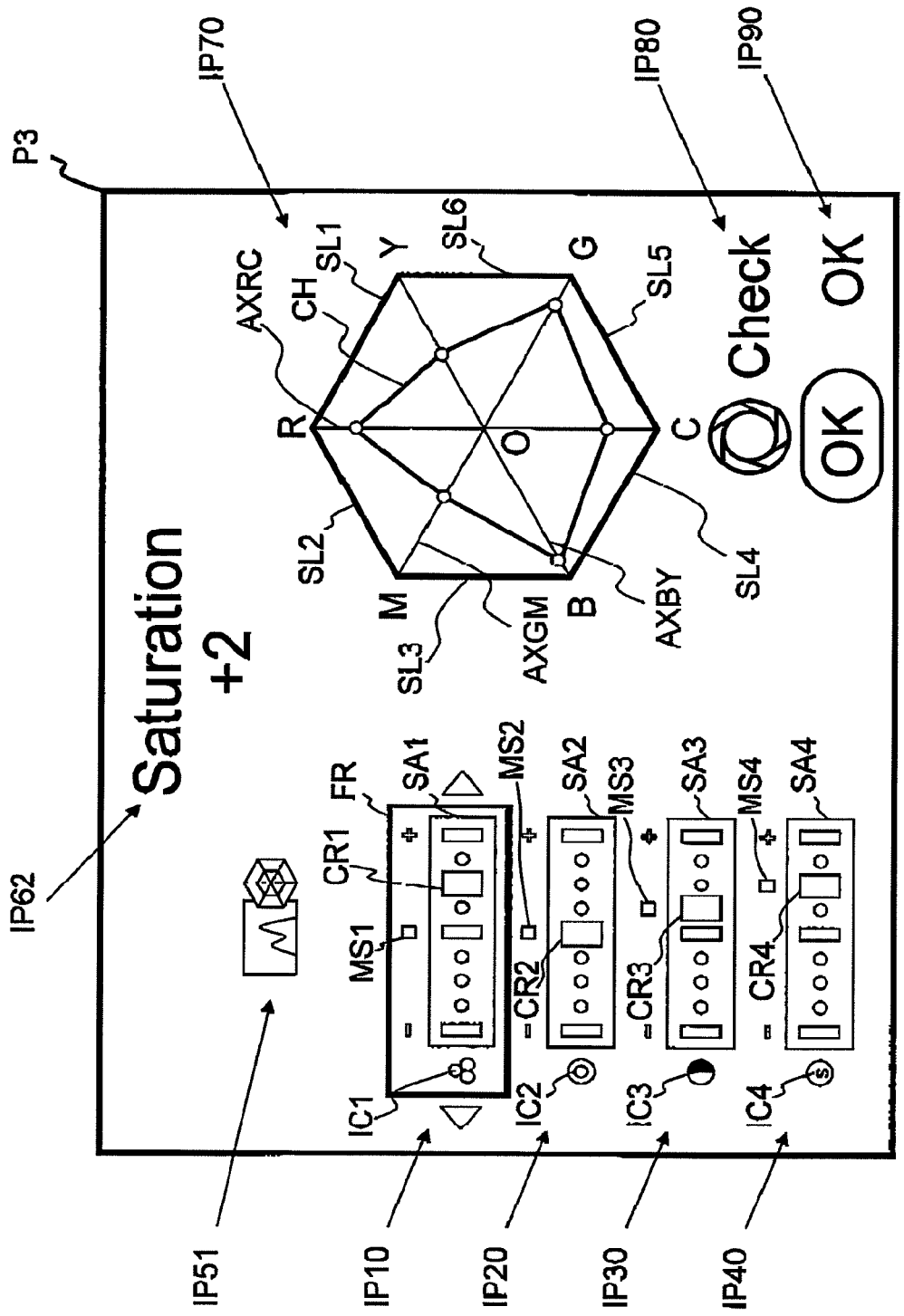
FIG. 6 is the display content of the third image-processing setting picture without the preview image, when general saturation in adjusted.
Figure 10:
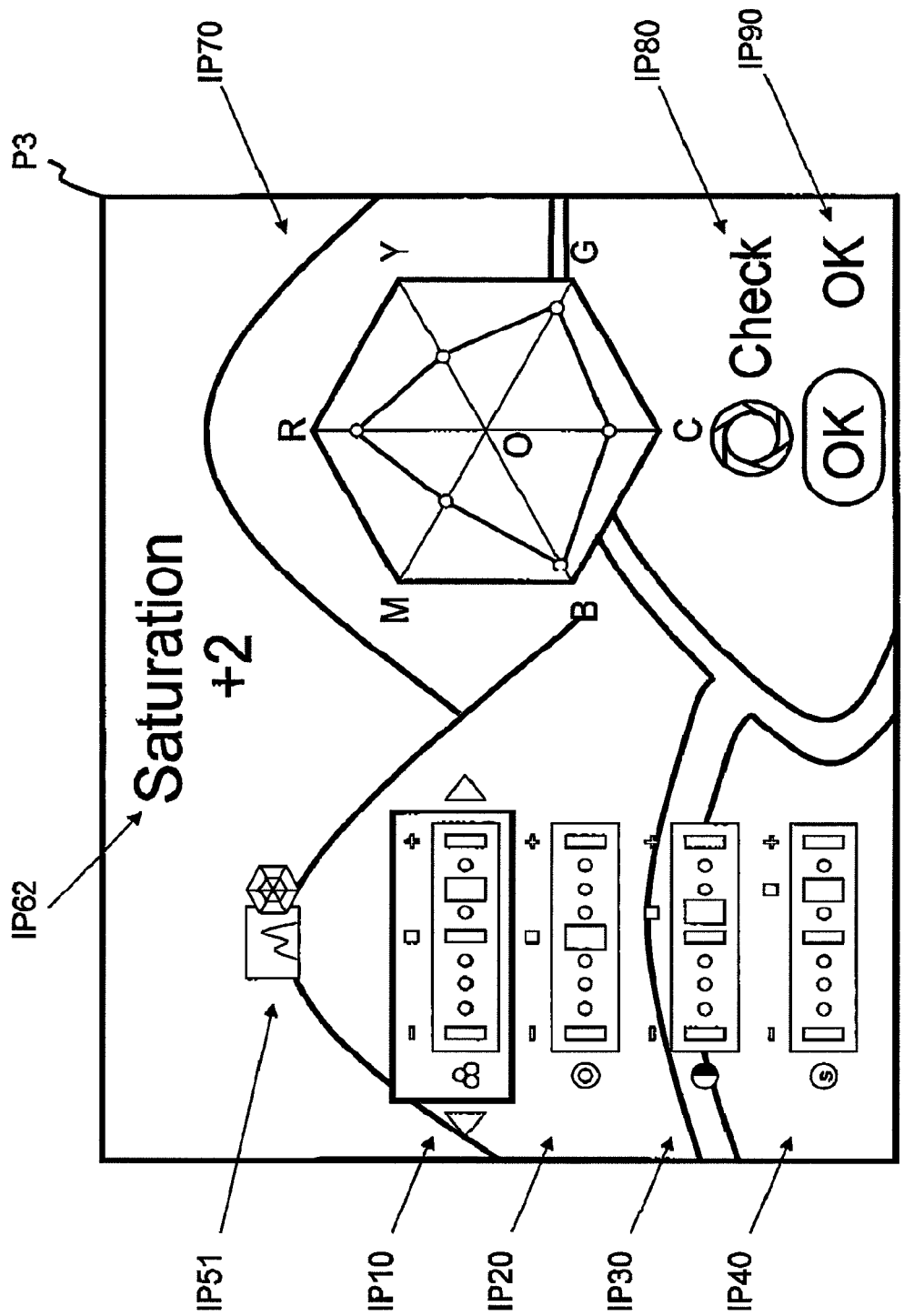
FIG. 10 is the display content of the third image-processing setting picture and the preview image, when general saturation is adjusted.

Furthermore, when the preset value of general saturation is increased, saturation of each color component is increased so that the hexagon that shows the radar chart CH is expanded to a similar hexagonal form (see FIGS. 6 and 10). When the preset value of general saturation is decreased, saturation of each color component is decreased so that the hexagon showing the radar chart CH is shrunk to a similar hexagonal form.

Figure 7:
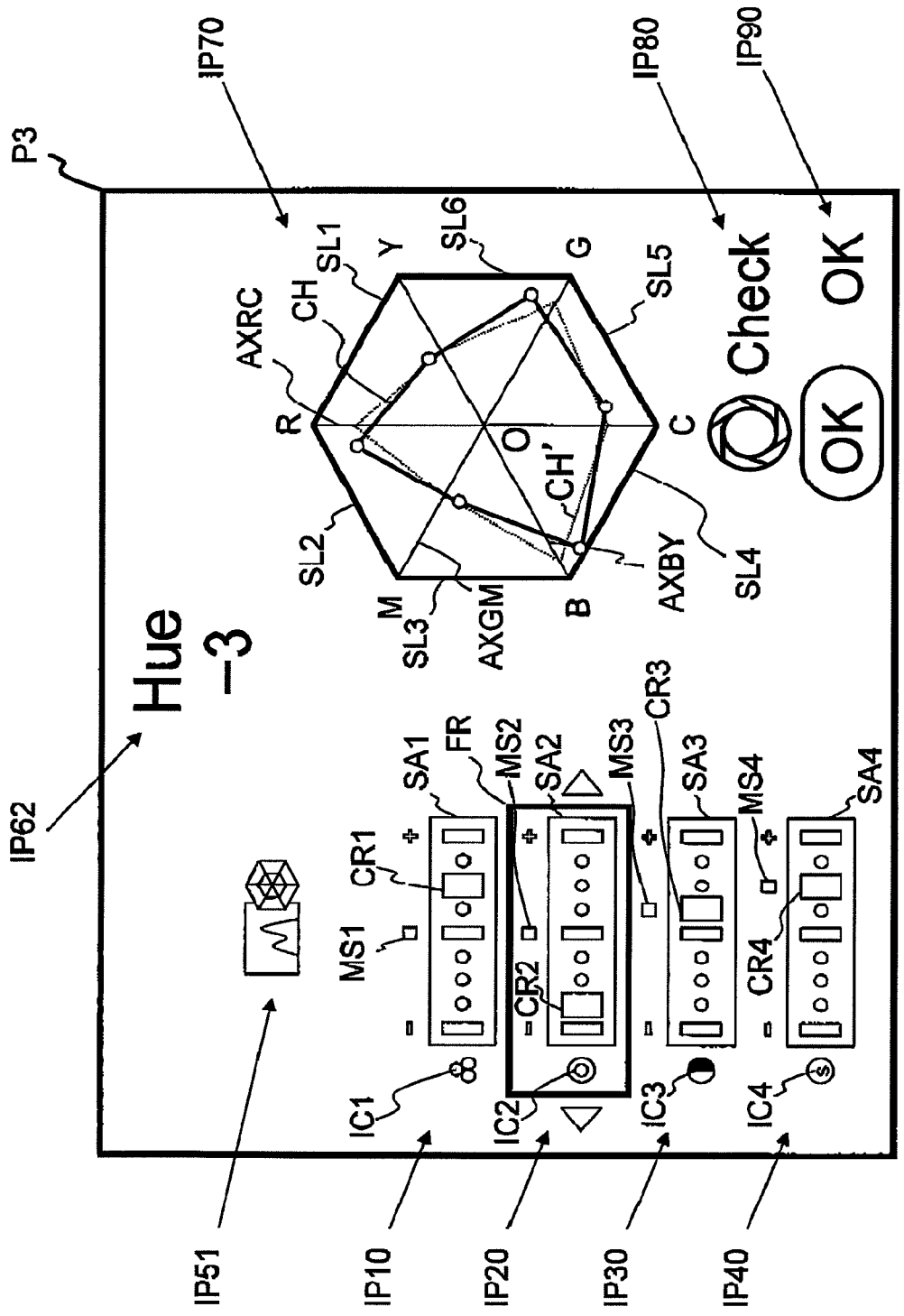
FIG. 7 is the display content of the third image-processing setting picture without the preview image, under the condition in which hue is adjusted.
Figure 11:
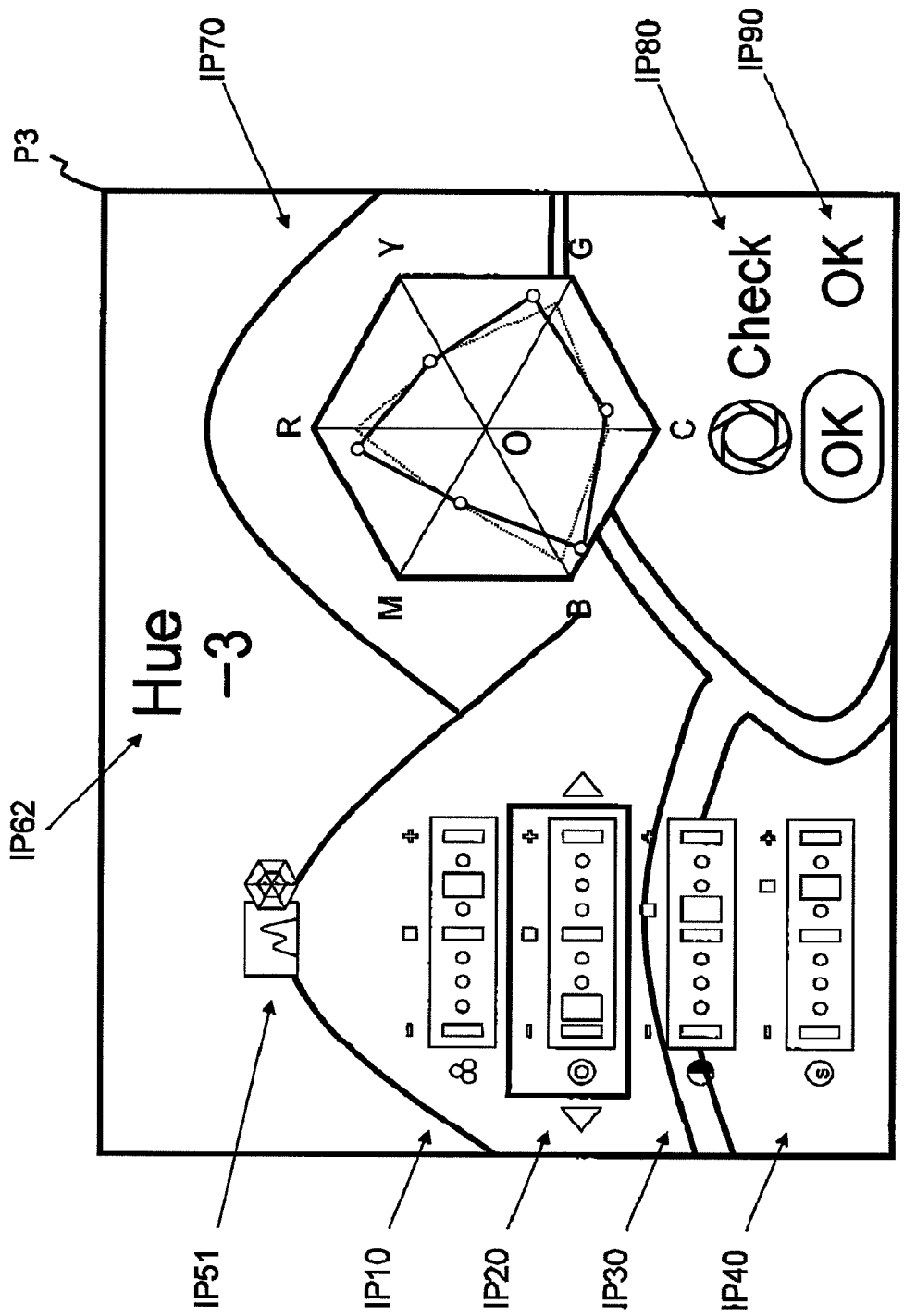
FIG. 11 is the display content of the third image-processing setting picture and the preview image, under the condition in which hue is adjusted.

When the preset hue value is changed, the hexagon showing the radar chart CH is rotated around the origin point O, according to the direction and quantity of hue change (see FIGS. 7 and 11). In this case, the form and size of the hexagon are not changed.

Even when the preset values of contrast and sharpness are changed, these changes do not influence the preset value of general saturation so that the shape, size, and inclination of the hexagon that shows the radar chart CH does not change.

In the case that the preset value of hue is changed from the intermediate (reference) value so that the hexagon that shows the radar chart CH is rotated, a hexagon that shows a radar chart CH' before rotation may be indicated on the color status indication area IP70 with the dotted line, in addition to the indication of the radar chart CH after rotation (see FIGS. 7 and 11).

A regular hexagon-shaped frame making the external border of the hexagonal indication area of the color status indication area IP70 has a right-upper side part SL1, a left-upper side part SL2, a left-side part SL3, a left-lower side part SL4, a right-lower side part SL5, and a right-side part SL6.

The inside of the hexagonal indication area of the color status indication area IP70 is of a non-transparent color. Therefore, the part of the preview image superimposed by the hexagonal indication area of the color status indication area IP70 is not visible.

The right-upper side part SL1 has a color gradation with the amount of yellow Y increasing in the right direction and with the amount of red R increasing in the left direction.

The left-upper side part SL2 has a color gradation with the amount of red R increasing in the right direction and with the amount of magenta M increasing in the left direction.

The left-side part SL3 has a color gradation with the amount of magenta M increasing in the upper direction and with the amount of blue B increasing in the lower direction.

The left-lower side part SL4 has a color gradation with the amount of blue B increasing in the left direction and with the amount of cyan C increasing in the right direction.

The right-lower side part SL5 has a color gradation with the amount of cyan C increasing in the left direction and with the amount of green G increasing in the right direction.

The right-side part SL6 has a color gradation with the amount of green G increasing in the lower direction and with the amount of yellow Y increasing in the upper direction.

When the up direction key 16a or the down direction key 16b is depressed under the condition in which the first image-processing setting picture P1 is indicated on the first display 92a, a selection-area indication frame FR is moved in the vertical direction and selects a color-adjustment item for adjustment form among: the general-saturation-setting indication area IP10, the hue-setting indication area IP20, the contrast-setting indication area IP30, and the sharpness-setting indication area IP40.

FIG. 4 shown that the first image-processing setting picture P1 is displayed, the selection-area indication frame FR is located at the first image-tone mode indication area IP51, and the natural image tone mode is selected as the image tone mode so that the remaining image tone modes can be selected by operating the right direction key 16c or the left direction key 16d.

When the right direction key 16c or the left direction key 16d is depressed under the condition in which the first image-processing setting picture P1 is indicated on the first display 92a, the indication on the first display 92a is changed from the first image-processing setting picture P1 to the second image-processing setting picture P2 that is used for selecting the image tone mode (see FIGS. 5 and 9).

When the up direction key 16a or the down direction key 16b is depressed under the condition in which the first image-processing setting picture P1 is indicated on the first display 92a, the selection-area indication frame FR is moved in the vertical direction and the indication on the first display 92a is changed from the first image-processing setting picture P1 to the third image-processing setting picture P3 that is used for adjusting the preset values of the selected image tone mode before depressing the up direction key 16a or the down direction key 16b (see FIGS. 6, 7, 10, and 11).

The second image-processing setting picture P2 has the general-saturation-setting indication area IP10, the hue-setting indication area IP20, the contrast-setting indication area IP30, the sharpness-setting indication area IP40, a second image-tone mode indication area IP52, the image tone mode identification area IP61, the color status indication area IP70, the preview command indication area IP80, and the decision command indication area IP90 (see FIGS. 5 and 9).

The second image-tone mode indication area IP52 displays icons representing the selectable image tone modes.

FIGS. 5 and 9 show the case in which the landscape image tone mode is selected as the image tone mode.

The second image-tone mode indication area IP52 displays the selected image-tone mode as a large icon, surrounded by the selection-area indication frame FR, and displays the other selectable image-tone modes in icons smaller than the selected image-tone mode.

Icon parts of the second image-tone mode indication area IP52 are of a non-transparent color. Therefore, the part of the preview image superimposed by the icon parts of the second image-tone mode indication area IP52 are not visible.

When the first image-processing setting picture P1 is indicated on the first display 92a, the selection-area indication frame FR has a frame that emphasizes the selected image-tone mode and right and left direction arrows around the frame. The right direction arrow corresponds to the right direction key 16c. The left direction arrow corresponds to the left direction key 16d.

When the second image-processing setting picture P2 is indicated on the first display 92a, the selection-area indication frame FR has a frame that emphasizes the selected image-tone mode and a down direction arrow around the frame. The down direction arrow corresponds to the down direction key 16b.

When the third image-processing setting picture P3 is indicated on the first display 92a, the selection-area indication frame FR has a frame that emphasizes the selected color-adjustment item of which the preset value is adjusted and right and left direction arrows around the frame. The right direction arrow corresponds to the right direction key 16c. The left direction arrow corresponds to the left direction key 16d.

When the right direction key 16c or the left direction key 16d is depressed under the condition in which the second image-processing setting picture P2 is indicated on the first display 92a, the selection-area indication frame FR is moved in the horizontal direction so that the image tone mode is changed.

When the up direction key 16a or the down direction key 16b is depressed under the condition in which the second image-processing setting picture P2 is indicated on the first display 92a, the selection-area indication frame FR is moved in the vertical direction and the indication on the first display 92a is changed from the second image-processing setting picture P2 to the third image-processing setting picture P3.

The third image-processing setting picture P3 has the general-saturation-setting indication area IP10, the hue-setting indication area IP20, the contrast-setting indication area IP30, the sharpness-setting indication area IP40, the first image-tone mode indication area IP51, the color-adjustment item identification and preset-value indication area IP62, the color status indication area IP70, the preview command indication area IP80, and the decision command indication area IP90 (see FIGS. 6, 7, 10 and 11).

The color-adjustment item identification and preset-value indication area IP62 displays the name of the selected color-adjustment item whose preset value is to be adjusted and the current preset value of the selected color-adjustment item.

FIGS. 6 and 10 show a status in which the landscape image tone mode is selected as the image tone mode, general saturation is selected as the color-adjustment item, and the preset value of general saturation is adjusted higher than the intermediate value.

FIGS. 7 and 11 show a status in which the landscape image tone mode is selected as the image tone mode, hue is selected as the color-adjustment item, and the preset value of hue is adjusted (rotated) in the minus direction from the intermediate value.

When the right direction key 16c or the left direction key 16d is depressed under the condition in which the third image-processing setting picture P3 is indicated on the first display 92a, the cursor for the selected color-adjustment item, in other words, one of the first, second, third, and fourth cursors CR1, CR2, CR3, and CR4 is moved in the horizontal direction.

When the up direction key 16a or the down direction key 16b is depressed under the condition in which the third image-processing setting picture P3 is indicated on the first display 92a, the selection-area indication frame FR is moved in the vertical direction so that the color-adjustment item whose preset value is to be adjusted is changed. In this case, when the image tone mode is selected as the color-adjustment item, the indication on the first display 92a is changed from the third image-processing setting picture P3 to the first image-processing setting picture P1.

When the image tone mode is changed under the condition in which the first image-processing setting picture P1 or the second image-processing setting picture P2 is indicated on the first display 92a, the image-processing operation for the image data corresponding to the preview image it performed on the basic of the color status corresponding to the selected image tone mode (see step S53 in FIG. 4). Then, the still image resulting from the image-processing operation on the basis of the selected image tone mode is displayed behind the indicator of the image-processing operation (the first image-processing setting picture P1 or the second image-processing setting picture P2). Therefore, the adjustment of the image tone mode can be visually judged.

When the preset value of the color-adjustment item for the image-processing operation is adjusted under the condition in which the third image-processing setting picture P3 is indicated on the first display 92a, the image-processing operation for the image data corresponding to the preview image is performed on the basis of the color status corresponding to the adjusted preset value of the color-adjustment item (see step S53 in FIG. 4). Then, the still image resulting from the image-processing operation on the basis of the adjusted preset value is displayed behind the indicator of the image-processing operation (the third image-processing setting picture P3). Therefore, adjustment of the preset value of the color-adjustment item for the image-processing operation can be visually judged.

Furthermore, when the image tone mode is changed under the condition in which the first image-processing setting picture P1 or the second image-processing setting picture P2 is indicated on the first display 92a, or when the preset value or the color-adjustment item for the image-processing operation is adjusted under the condition in which the third image-processing setting picture P3 is indicated on the first display 92a, the form, etc., of the radar chart CH on the color status indication area IP70 is changed. Therefore, the color status of the image-processing operation after changing the image tone mode or the preset value of the color-adjustment item for the image-processing operation can be visually judged.

Moreover, when the power supply lever 12 is rotated to the preview position under the condition in which one of the first, second, and third image-processing setting pictures P1, P2, and P3 is indicated on the first display 92a, the photographic operation is newly performed, the image data obtained by the photographic operation is temporarily stored to the SDRAM 80, and the still image corresponding to the temporarily stored image data is displayed behind the indicator of the image-processing operation (the first image-processing setting picture P1 or the second image-processing setting picture P2 or the third image-processing setting picture P3) after the image-processing operation on the basis of at least one of the selected image tone mode and the adjusted preset value of the color-adjustment item of the selected image tone mode.

When the OK button 17 is depressed under the condition in which one of the first, second, and third image-processing setting pictures P1, P2, and P3 is indicated on the first display 92a, the selected image tone mode and the adjusted preset value of the color-adjustment item of the selected image tone mode are fixed, and then the indication is then switched from one of the first, second, and third image-processing setting pictures P1, P2, and P3 to the normal capture mode.

Next, the calculation for specifying the form of the radar chart CH, in other words, for specifying the plot position of each color's SAT (saturation value) on the color status indication area IP70 is explained. This calculation is performed for each color component.

First, a first output value LOUT 1 is calculated by multiplying a reference input value REF, a color-adjustment matrix CC, a YCbCr conversion matrix YC, and a rotation matrix ADJ (LOUT 1=ADJ×YC×CC×REF).

The reference input value REF shows coordinate values of each color component (red R, green G, blue B, yellow Y, cyan C, and magenta M) in an RGB coordinate system. For example, red R is represented by (255,0,0), green G is represented by (0,255,0), blue B is represented by (0,0,255), yellow Y is represented by (128,128,0), cyan C is represented by: (0,128,128), and magenta M is represented by: (128,0,128).

The color-adjustment matrix CC corresponds to general saturation and the selected image tone mode.

The YCbCr conversion matrix YC is used for converting from the RGB coordinate system to the YCbCr coordinate system.

The rotation matrix ADJ is used for a color space conversion, in other words, for rotating the coordinate axis in order to obtain the plot position of each color on one of: the RC axis AXRC, the GM axis AXGM, and the BY axis AXBY.

Second, a first square value of a Cb component of the first output value LOUT 1 and a second square value of a Cr component of the first output value LOUT 1 are calculated.

Then the plot position of each color SAT on the axis is calculated by calculating the square root of the first square value $Cb^2$ and the second square value $Cr^2$ ($SAT=(Cb^2+Cr^2)^{1/2}$), that gives the difference between the plotted point and the origin point O.

When hue is adjusted, the plot position of each color component is rotated around the origin point O corresponding to the direction and quantity of hue change.

For example, FIGS. 7 and 11 show that hue is adjusted such that red R is adjusted towards the magenta M side, magenta M is adjusted towards the blue B side, blue B is adjusted towards the cyan C side, cyan C is adjusted towards the green G side, green G is adjusted towards the yellow Y side, and yellow Y is adjusted towards the red R side.

Figure 12:
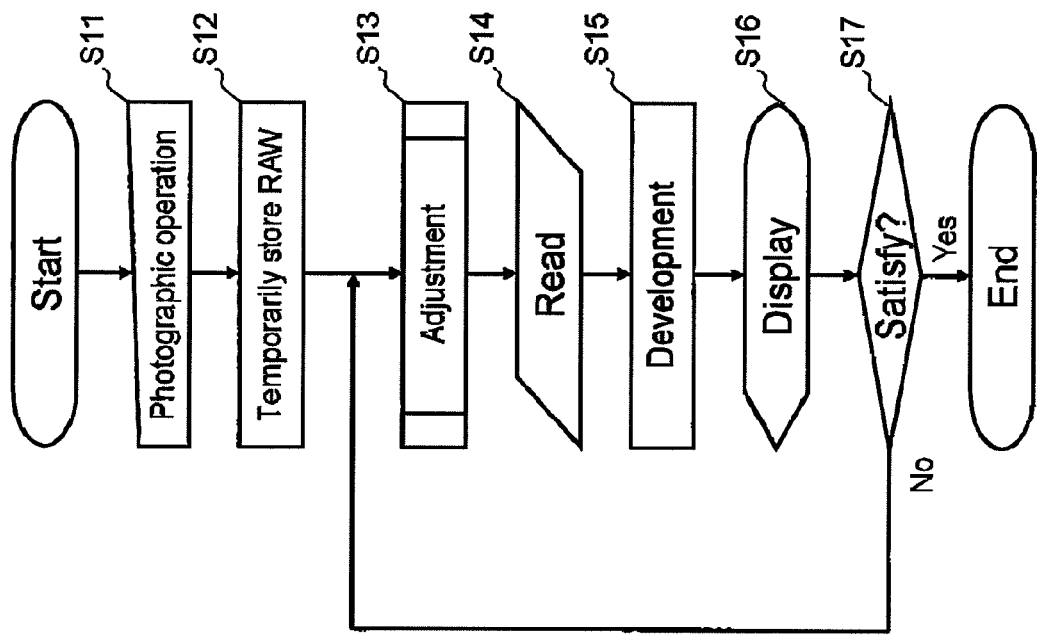
FIG. 12 is a flowchart giving the flow of adjustment of the color status of the image-processing operation on the RAW data and the development of the RAW data.

Next, the flow of the color status adjustment in the image-processing operation on the RAW data and the development of the RAW data is explained using the flowchart in FIG. 12.

When the power supply lever 12 is rotated to the preview position, the photographic subject image is captured as an optical image through the lens 51 by the imaging sensor 53 in step S11. The still image obtained by the photographic operation is displayed on the first display 92a after the A/D conversion operation by the AFE 55 and the image-processing operation by the DSP 60.

In step S12, the image data of the still image obtained by the photographic operation is temporarily stored in the SDRAM 80 as RAW data that has not yet been image-processed.

In step S13, the color status adjustment is performed. The details of the adjustment of the color status are given later using the flowchart of FIG. 13.

In step S14, the RAW data that is temporarily stored in the SDRAM 80 is read.

In step S15, the development is performed including the image-processing operation on the RAW data that is read from the SDRAM 80. The details of the development are given later using the flowchart in FIG. 14.

In step S16, the still image corresponding to the image data following development is displayed on the first display 92a.

In step S17, it is determined whether the user is satisfied with the color status resulting from step S13, by observing the image displayed on the first display 92a.

When the user is satisfied, the operation ends. Otherwise, the operation returns to step S13 so that the adjustment of the color status of the RAW data and the development of the RAW data are repeatedly performed.

Figure 13:
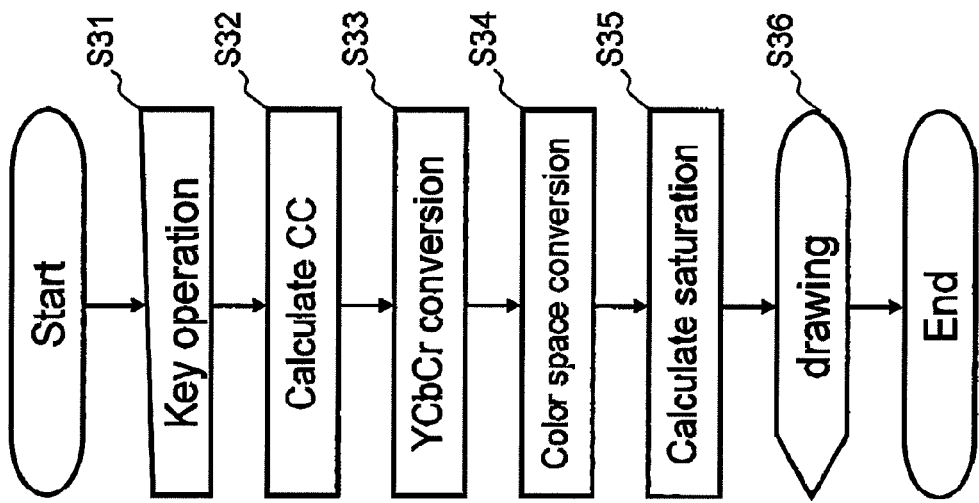
FIG. 13 is a flowchart giving the details of color status adjustment in the image-processing operation on the RAW data.

Next, the details of the adjustment of the color status are given using the flowchart of FIG. 13.

In step S31, one of the direction keys 16 etc., is operated by the user in order to select the image tone mode or to adjust the preset value of each color-adjustment item including general saturation, hue, contrast and sharpness.

In step S32, the color-adjustment matrix CC is calculated on the basis of the selected image tone mode and the adjusted preset value of general saturation so that the color-adjustment matrix CC and the reference input value REF of each color are multiplied (CC×REF).

In step S33, the conversion from the RGB coordinate system to the YCbCr coordinate system is performed, in other words, the YCbCr matrix YC and the product of the color-adjustment matrix CC and the reference input value REF are multiplied (YC×CC×REF).

In step S34, the color space is converted to obtain the plot position of each color component on one of: the RC axis AXRC, the GM axis AXGM, and the BY axis AXBY. In other words, the rotation matrix ADJ and the product of the YCbCr matrix YC, the color-adjustment matrix CC, and the reference input value REF are multiplied so that the first output value LOUT 1 is calculated (LOUT 1=ADJ×YC×CC×REF).

In step S35, the first square value of the Cb component of the first output value LOUT 1 and the second square value of the Cr component of the first output value LOUT 1 are calculated. Then the plot position of each color SAT on the axis is calculated by taking the square root of the first square value $Cb^2$ and the second square value $Cr^2$ ($SAT=(Cb^2+Cr^2)^{1/2}$).

In step S36, the radar chart CH is drawn on the color status indication area IP70 on the basis of the calculated value of saturation SAT of each color component.

When hue is adjusted, in other words, when the preset value of hue becomes different from the intermediate value, the radar chart CH is rotated around the origin point O, corresponding to the difference between the preset value or hue and the intermediate value, in other words, corresponding to the direction and quantity of hue change.

Figure 14:
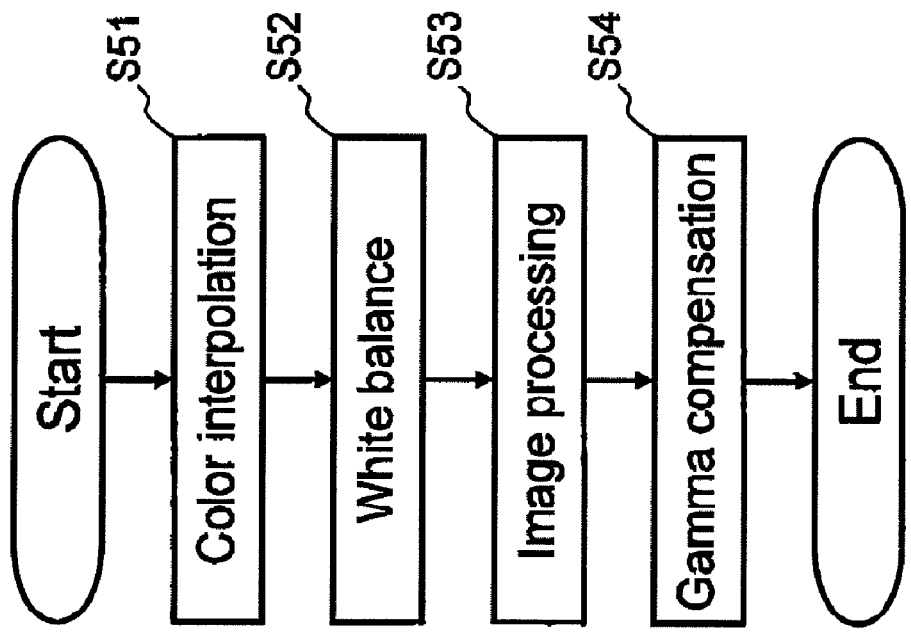
FIG. 14 is a flowchart giving the details of the development of the RAW data.
Figure 15:
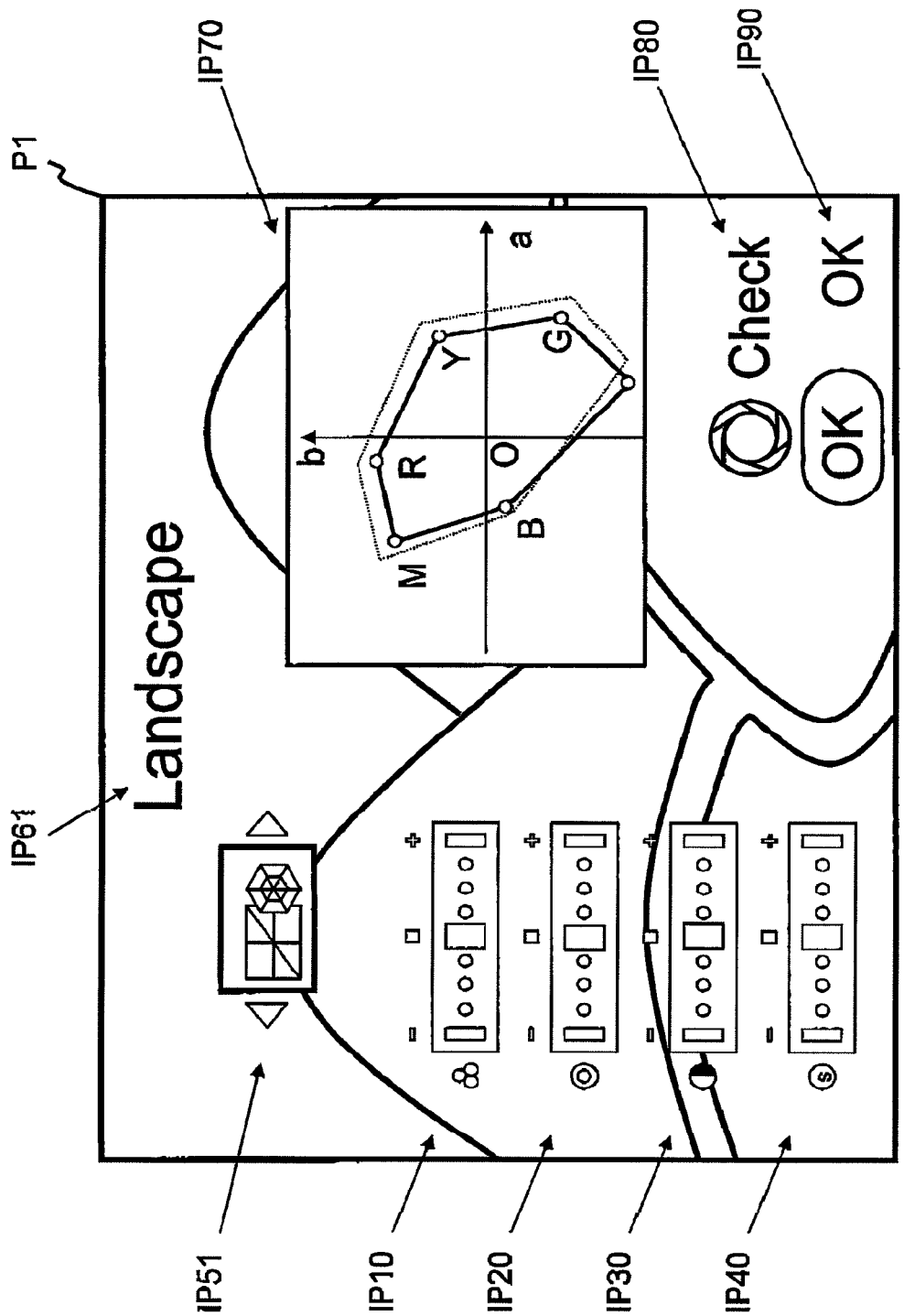
FIG. 15 is the display content of the first image-processing setting picture that has a color status indication area depicting the saturation of each color component on a plane including an a-axis and a b-axis in the L*a*b* coordinate system.

Next, the details of the development of the RAW data are explained using the flowchart in FIG. 14. In step S51, a color interpolation operation of the RAW data is performed. In step S52, an adjustment is made to the white balance of the RAW data. In step S53, the image-processing operation is performed on the basis of the selected image tone mode and the adjusted preset value of each color-adjustment item (general saturation, hue, contrast, and sharpness). In step S54, gamma compensation is performed.

In the embodiment, it is explained that the radar chart CH is drawn on the color status indication area IP70, however, another chart showing the color status including hue and saturation may be drawn on the color status indication area IP70.

For example, the L*a*b* coordinate system may be used. Specifically, a second output value LOUT 2 of each color component considering hue and saturation are plotted on a plane including an a-axis and a b-axis in the L*a*b* coordinate system, giving a L*a*b* chart.

In this case, the second output value LOUT 2 of each color component is calculated by multiplying the reference input value REF, the color-adjustment matrix CC, a L*a*b* conversion matrix CS, and a hue-rotation matrix R (LOUT 2=R× CS×CC×REF).

The L*a*b* conversion matrix CS is used for converting from the RGB coordinate system to the L*a*b* coordinate system.

The hue-rotation matrix R is used for rotating the L*a*b* chart with respect to hue.

A plot position of each color SAT that forms the L*a*b* chart on the L*a*b* coordinate system is determined on the basis of the a direction component of the second output value LOUT 2 and the b-direction component of the second output value LOUT 2.

In this case, as each color component, another color component of red R, green G, blue B, yellow Y, cyan C, and magenta M can be used for plotting in the L*a*b* coordinate system.

Furthermore, in the embodiment, it is explained that the still image is displayed on the first display 92a behind the indicator of the first image-processing setting picture P1, etc., however, a video image (moving-image) may alternately be displayed.

In addition, the RAW data or the YCbCr data that is stored in the memory unit 70 may be used as the image data for the preview on the first display 92a.

Moreover, before storage in the memory unit 70 or the SDRAM 80, the image data may be used for the preview on the first display 92a.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2007-207756 (filed on Aug. 9, 2007), which is expressly incorporated herein by reference, in its entirety.

The invention claimed is:

1. A photographic apparatus comprising:
an imaging sensor that obtains image data;
an image-processing unit that performs an image-processing operation on said image data; and
a display unit that displays an image-processing setting picture having a setting-status indication area that shows a setting status of said image-processing operation, and having a color status indication area that displays a diagrammatic representation of a color status in said image-processing operation corresponding to said setting status;
said setting-status indication area showing hue in said image-processing operation, as said setting status;
said color status indication area having a figure that shows saturations of a plurality of color components in said image-processing operation in order to display said diagrammatic representation of said color status, said figure being rotated according to said hue, a shape of said figure and a size of said figure changing in accordance with said saturations.

2. The photographic apparatus according to claim 1, wherein said figure is a two-dimensional figure that links a plurality of points showing said saturations of said plurality of said color components and being plotted on said color status indication area.

3. The photographic apparatus according to claim 2, wherein said two-dimensional figure is a radar chart that has first and second axes;
said color components consists of a first color component, a second color component, a third color component that has a complementary relationship with said first color component, and a fourth color component that has a complementary relationship with said second color component;
said radar chart is indicated on said color status indication area, said radar chart being rotated around an intersection point of said first and second axes, in accordance with said hue;
a first apex of said radar chart showing saturation of said first color component, a second apex of said radar chart showing saturation of said second color component, a third apex of said radar chart showing maturation of said third color component, and a fourth apex of said radar chart showing saturation of said color component;
said first apex and said third apex are plotted near said first axis; and
said second apex and said fourth apex are plotted near said second axis.

4. The photographic apparatus according to claim 2, wherein said two-dimensional figure is a radar chart that has first, second, and third axes;
said color components consists of red, green, blue, yellow, cyan, and magenta;
said radar chart is indicated on said color status indication area, said radar chart being rotated around an intersection point of said first, second, and third axes, in accordance with said hue;
a first apex of said radar chart showing saturation of said red, a second apex of said radar chart showing saturation of said magenta, a third apex of said radar chart showing saturation of said blue, a fourth apex of said radar chart showing saturation of said cyan, a fifth apex of said radar chart showing saturation or said green, and a sixth apex of said radar chart showing saturation of said yellow;
said first apex and said fourth apex are plotted near said first axis;
said second apex and said fifth apex are plotted near said second axis; and
said third apex and said sixth apex are plotted near said third axis.

5. The photographic apparatus according to claim 1, wherein said color status indication area shows said saturations of said plurality of said color components on a plane including an a-axis and a b-axis in a L*a*b* coordinate system, in order to display said diagrammatic representation of said color status.

6. The photographic apparatus according to claim 1, wherein said display unit displays said image-processing setting picture, in combination with an image corresponding to said image data after said image-processing operation based on said setting status is made.

* * * * *